US012686781B2

(12) United States Patent
Hara

(10) Patent No.: US 12,686,781 B2
(45) Date of Patent: Jul. 21, 2026

(54) INK JET INK COMPOSITION AND RECORDING METHOD

(71) Applicant: SEIKO EPSON CORPORATION, Tokyo (JP)

(72) Inventor: Kentaro Hara, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 177 days.

(21) Appl. No.: 18/882,945

(22) Filed: Sep. 12, 2024

(65) Prior Publication Data

US 2025/0084268 A1 Mar. 13, 2025

(30) Foreign Application Priority Data

Sep. 13, 2023 (JP) ................................ 2023-148227

(51) Int. Cl.
*B41J 2/21* (2006.01)
*C09D 11/322* (2014.01)
*C09D 11/38* (2014.01)

(52) U.S. Cl.
CPC .......... *C09D 11/322* (2013.01); *B41J 2/2114* (2013.01); *C09D 11/38* (2013.01)

(58) Field of Classification Search
CPC ....... B41J 2/01; B41J 2/21; B41J 2/211; B41J 2/2114; B41M 5/00; C09D 11/037; C09D 11/102; C09D 11/30; C09D 11/322; C09D 11/38
See application file for complete search history.

(56) References Cited

U.S. PATENT DOCUMENTS

2015/0175825 A1* 6/2015 Yamazaki ............... C08K 5/06 106/31.77
2020/0009890 A1 1/2020 Yamazaki et al.
2020/0385593 A1* 12/2020 Uchizono ............. B41J 2/2107

FOREIGN PATENT DOCUMENTS

JP 2020-007444 A 1/2020

* cited by examiner

*Primary Examiner* — Anh T Vo
(74) *Attorney, Agent, or Firm* — Harness, Dickey & Pierce, P.L.C.

(57) ABSTRACT

An aqueous ink jet ink composition includes a color material, an acetylene glycol-based surfactant, glycerin, a 6-, 7-, or 8-membered lactam, in which the content of the glycerin is 9% by mass or less based on the total mass of the ink composition, and the mass ratio of the content of the 6-, 7-, or 8-membered lactam to the content of the acetylene glycol-based surfactant is 0.5 or more and less than 5.

14 Claims, 3 Drawing Sheets

TABLE 1

| | | EXAMPLE | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| COLOR MATERIAL | SELF-DISPERSED PIGMENT | 6.0 | 6.0 | 6.0 | 6.0 | 6.0 | 6.0 | 6.0 | 6.0 | 6.0 | 6.0 | 6.0 | 6.0 | 6.0 |
| RESIN | WATER-SOLUBLE URETHANE RESIN 1 | 0.5 | 0.5 | 0.5 | 0.5 | - | - | 0.5 | - | 0.5 | 0.5 | - | - | 0.5 |
| | WATER-SOLUBLE URETHANE RESIN 2 | - | - | - | - | - | - | - | - | - | - | 0.5 | - | - |
| | EMULSION RESIN (HIGH Tg) | - | - | - | - | 0.5 | - | - | - | - | - | - | 0.5 | - |
| | EMULSION RESIN (LOW Tg) | - | - | - | - | - | 0.5 | - | - | - | - | - | - | - |
| LACTAM | 2-PYRROLIDONE | - | - | - | - | - | - | - | - | - | - | - | - | - |
| | HEP | - | - | - | - | - | - | - | - | - | - | - | - | - |
| | ε-CAPROLACTAM (CPL) | 2.0 | 3.5 | 0.5 | 2.0 | 2.0 | 2.0 | 2.0 | 2.0 | 2.0 | 2.0 | 2.0 | 2.0 | 2.0 |
| INORGANIC OXIDE | SI-30 | - | - | - | - | - | - | 2.0 | - | - | - | - | - | - |
| BETAINE | TRIMETHYLGLYCINE | 5.0 | 5.0 | 5.0 | - | 5.0 | 5.0 | 5.0 | 5.0 | 5.0 | 5.0 | 5.0 | 5.0 | 5.0 |
| ORGANIC SOLVENT | GLYCERIN | 5.6 | 5.6 | 5.6 | 5.6 | 5.6 | 5.6 | 5.6 | 5.6 | 5.6 | 2.0 | 5.6 | 5.6 | 5.6 |
| | TRIETHYLENE GLYCOL | 8.1 | 8.1 | 8.1 | 8.1 | 8.1 | 8.1 | 6.1 | 8.1 | 8.1 | 8.1 | 8.1 | 8.1 | 8.1 |
| | 1,2-HEXANEDIOL | 4.5 | 4.5 | 4.5 | 4.5 | 4.5 | 4.5 | 4.5 | 4.5 | 4.5 | 4.5 | 4.5 | 4.5 | 4.5 |
| ACETYLENE GLYCOL SURFACTANT | OLFINE E1010 | 0.5 | 0.5 | 0.5 | 0.5 | 0.5 | 0.5 | 0.5 | 0.5 | 0.4 | 0.5 | 0.5 | 0.6 | 0.5 |
| | SURFYNOL 104PG50 | 0.25 | 0.25 | 0.25 | 0.25 | 0.25 | 0.25 | 0.25 | 0.25 | 0.35 | 0.25 | 0.25 | 0.30 | - |
| | SURFYNOL 420 | - | - | - | - | - | - | - | - | - | - | - | - | 0.25 |
| ANOTHER SURFACTANT | BYK348 | - | - | - | - | - | - | - | - | - | - | - | - | - |
| ALKALI | TRIETHANOLAMINE | 0.5 | 0.5 | 0.5 | 0.5 | 0.5 | 0.5 | 0.5 | 0.5 | 0.5 | 0.5 | 0.5 | 0.5 | 0.5 |
| WATER | PURE WATER | BALANCE | BALANCE | BALANCE | BALANCE | BALANCE | BALANCE | BALANCE | BALANCE | BALANCE | BALANCE | BALANCE | BALANCE | BALANCE |
| TOTAL | | 100 | 100 | 100 | 100 | 100 | 100 | 100 | 100 | 100 | 100 | 100 | 100 | 100 |
| | SPECIFIC LACTAM/SURFACTANT | 2.7 | 4.7 | 0.7 | 2.7 | 2.7 | 2.7 | 2.7 | 2.7 | 2.7 | 2.7 | 2.7 | 2.2 | 2.7 |
| EVALUATION RESULT | CURLING RESISTANCE | A | A | A | A | A | A | A | A | A | A | A | A | A |
| | SOLUBILITY (CLOUD POINT AT 60°C) | A | A | B | B | A | A | A | B | B | B | A | B | A |
| | TRANSFER PROPERTY | A | A | A | A | B | A | B | B | A | B | A | A | A |
| | DISCHARGE STABILITY (INTERMITTENT) | A | B | A | A | A | B | A | A | A | B | B | B | A |

FIG. 2

TABLE 1

| | | EXAMPLE | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| COLOR MATERIAL | SELF-DISPERSED PIGMENT | 6.0 | 6.0 | 6.0 | 6.0 | 6.0 | 6.0 | 6.0 | 6.0 | 6.0 | 6.0 | 6.0 | 6.0 | 6.0 |
| RESIN | WATER-SOLUBLE URETHANE RESIN 1 | 0.5 | 0.5 | 0.5 | 0.5 | - | - | 0.5 | - | 0.5 | 0.5 | - | - | 0.5 |
| | WATER-SOLUBLE URETHANE RESIN 2 | - | - | - | - | - | - | - | - | - | - | 0.5 | - | - |
| | EMULSION RESIN (HIGH Tg) | - | - | - | - | 0.5 | - | - | - | - | - | - | 0.5 | - |
| | EMULSION RESIN (LOW Tg) | - | - | - | - | - | 0.5 | - | - | - | - | - | - | - |
| LACTAM | 2-PYRROLIDONE | - | - | - | - | - | - | - | - | - | - | - | - | - |
| | HEP | - | - | - | - | - | - | - | - | - | - | - | - | - |
| | ε-CAPROLACTAM (CPL) | 2.0 | 3.5 | 0.5 | 2.0 | 2.0 | 2.0 | 2.0 | 2.0 | 2.0 | 2.0 | 2.0 | 2.0 | 2.0 |
| INORGANIC OXIDE | SI-30 | - | - | - | - | - | - | 2.0 | - | - | - | - | - | - |
| BETAINE | TRIMETHYLGLYCINE | 5.0 | 5.0 | 5.0 | - | 5.0 | 5.0 | 5.0 | 5.0 | 5.0 | 5.0 | 5.0 | 5.0 | 5.0 |
| ORGANIC SOLVENT | GLYCERIN | 5.6 | 5.6 | 5.6 | 5.6 | 5.6 | 5.6 | 5.6 | 5.6 | 5.6 | 2.0 | 5.6 | 5.6 | 5.6 |
| | TRIETHYLENE GLYCOL | 8.1 | 8.1 | 8.1 | 8.1 | 8.1 | 8.1 | 6.1 | 8.1 | 8.1 | 8.1 | 8.1 | 8.1 | 8.1 |
| | 1,2-HEXANEDIOL | 4.5 | 4.5 | 4.5 | 4.5 | 4.5 | 4.5 | 4.5 | 4.5 | 4.5 | 4.5 | 4.5 | 4.5 | 4.5 |
| ACETYLENE GLYCOL SURFACTANT | OLFINE E1010 | 0.5 | 0.5 | 0.5 | 0.5 | 0.5 | 0.5 | 0.5 | 0.5 | 0.4 | 0.5 | 0.5 | 0.6 | 0.5 |
| | SURFYNOL 104PG50 | 0.25 | 0.25 | 0.25 | 0.25 | 0.25 | 0.25 | 0.25 | 0.25 | 0.35 | 0.25 | 0.25 | 0.30 | - |
| | SURFYNOL 420 | - | - | - | - | - | - | - | - | - | - | - | - | 0.25 |
| ANOTHER SURFACTANT | BYK348 | - | - | - | - | - | - | - | - | - | - | - | - | - |
| ALKALI | TRIETHANOLAMINE | 0.5 | 0.5 | 0.5 | 0.5 | 0.5 | 0.5 | 0.5 | 0.5 | 0.5 | 0.5 | 0.5 | 0.5 | 0.5 |
| WATER | PURE WATER | BALANCE | BALANCE | BALANCE | BALANCE | BALANCE | BALANCE | BALANCE | BALANCE | BALANCE | BALANCE | BALANCE | BALANCE | BALANCE |
| TOTAL | | 100 | 100 | 100 | 100 | 100 | 100 | 100 | 100 | 100 | 100 | 100 | 100 | 100 |
| | SPECIFIC LACTAM/SURFACTANT | 2.7 | 4.7 | 0.7 | 2.7 | 2.7 | 2.7 | 2.7 | 2.7 | 2.7 | 2.7 | 2.7 | 2.2 | 2.7 |
| EVALUATION RESULT | CURLING RESISTANCE | A | A | A | A | A | A | A | A | A | A | A | A | A |
| | SOLUBILITY (CLOUD POINT AT 60°C) | A | A | B | B | A | A | A | B | B | B | A | B | A |
| | TRANSFER PROPERTY | A | A | A | A | B | A | B | B | A | B | A | A | A |
| | DISCHARGE STABILITY (INTERMITTENT) | A | B | A | A | A | B | A | A | A | B | B | B | A |

FIG. 3

TABLE 2

| | | COMPARATIVE EXAMPLE | | | | | | | | |
|---|---|---|---|---|---|---|---|---|---|---|
| | | 1 | 2 | 3 | 4 | 5 | 6 | 7 | 8 | 9 |
| COLOR MATERIAL | SELF-DISPERSED PIGMENT | 6.0 | 6.0 | 6.0 | 6.0 | 6.0 | 6.0 | 6.0 | 6.0 | 6.0 |
| RESIN | WATER-SOLUBLE URETHANE RESIN 1 | 0.5 | 0.5 | 0.5 | 0.5 | 0.5 | 0.5 | 0.5 | 0.5 | 0.5 |
| | WATER-SOLUBLE URETHANE RESIN 2 | - | - | - | - | - | - | - | - | - |
| | EMULSION RESIN (HIGH Tg) | - | - | - | - | - | - | - | - | - |
| | EMULSION RESIN (LOW Tg) | - | - | - | - | - | - | - | - | - |
| LACTAM | 2-PYRROLIDONE | - | - | - | - | - | 2.0 | - | - | - |
| | HEP | - | - | - | - | - | - | 2.0 | - | - |
| | ε-CAPROLACTAM (CPL) | 0.3 | 4.5 | 2.0 | 0.0 | 2.0 | - | - | 2.0 | 2.0 |
| INORGANIC OXIDE | SI-30 | - | - | - | - | - | - | - | - | - |
| BETAINE | TRIMETHYLGLYCINE | 5.0 | 5.0 | - | 5.0 | 5.0 | 5.0 | 5.0 | 5.0 | 5.0 |
| ORGANIC SOLVENT | GLYCERIN | 5.6 | 5.6 | 10.6 | 5.6 | 5.6 | 5.6 | 5.6 | 9.5 | - |
| | TRIETHYLENE GLYCOL | 8.1 | 8.1 | 8.1 | 8.1 | 8.1 | 8.1 | 8.1 | 8.1 | 8.1 |
| | 1,2-HEXANEDIOL | 4.5 | 4.5 | 4.5 | 4.5 | 4.5 | 4.5 | 4.5 | 4.5 | 4.5 |
| ACETYLENE GLYCOL SURFACTANT | OLFINE E1010 | 0.5 | 0.5 | 0.5 | 0.5 | - | 0.5 | 0.5 | 0.5 | 0.5 |
| | SURFYNOL 104PG50 | 0.25 | 0.25 | 0.25 | 0.25 | - | 0.25 | 0.25 | 0.25 | 0.25 |
| | SURFYNOL 420 | - | - | - | - | - | - | - | - | - |
| ANOTHER SURFACTANT | BYK348 | - | - | - | - | 0.7 | - | - | - | - |
| ALKALI | TRIETHANOLAMINE | 0.5 | 0.5 | 0.5 | 0.5 | 0.5 | 0.5 | 0.5 | 0.5 | 0.5 |
| WATER | PURE WATER | BALANCE | BALANCE | BALANCE | BALANCE | BALANCE | BALANCE | BALANCE | BALANCE | BALANCE |
| TOTAL | | 100 | 100 | 100 | 100 | 100 | 100 | 100 | 100 | 100 |
| | SPECIFIC LACTAM/SURFACTANT | 0.4 | 6.0 | 2.7 | 0.0 | - | 0.0 | 0.0 | 2.7 | 2.7 |
| EVALUATION RESULT | CURLING RESISTANCE | A | A | C | A | A | A | A | C | A |
| | SOLUBILITY (CLOUD POINT AT 60°C) | C | A | A | C | A | C | C | A | B |
| | TRANSFER PROPERTY | B | A | A | B | C | A | A | A | C |
| | DISCHARGE STABILITY (INTERMITTENT) | A | C | A | A | A | A | A | A | C |

INK JET INK COMPOSITION AND RECORDING METHOD

The present application is based on, and claims priority from JP Application Serial Number 2023-148227, filed Sep. 13, 2023, the disclosure of which is hereby incorporated by reference herein in its entirety.

BACKGROUND

1. Technical Field

The present disclosure relates to an ink jet ink composition and a recording method.

2. Related Art

Ink jet recording methods are capable of recording highly fine images with a relatively simple device, and have been rapidly developed in various aspects. On the other hand, the problems with ink jet recording methods are that when recording is performed with an aqueous ink, curling of a recording medium occurs, and that the ink is dried in a nozzle and thickened, easily causing misdirection or discharge failure. Therefore, various studies have been made in order to improve performance of ink including these points. For example, JP-A-2020-7444 discloses an ink for ink jet recording, the ink including a pigment, colloidal silica, an acetylene glycol-based surfactant, and trimethylglycine, which is a betaine.

However, suppression of curling of recording media, discharge stability, suppression of ink transfer to recording media, and the like have not been sufficient.

SUMMARY

An ink jet ink composition of the present disclosure is an aqueous ink jet ink composition including a color material, an acetylene glycol-based surfactant, glycerin, and a 6-, 7-, or 8-membered lactam, in which the content of the glycerin is 9% by mass or less based on the total mass of the ink composition, and the mass ratio of the content of the 6-, 7-, or 8-membered lactam to the content of the acetylene glycol-based surfactant is 0.5 or more and less than 5.

An ink jet recording method of the present disclosure includes an ink adhering step of discharging the ink jet ink composition from an ink jet head to make the jet ink composition adhere to a recording medium.

BRIEF DESCRIPTION OF THE DRAWINGS

FIG. 2 shows ink compositions and evaluation results of Examples of the embodiment.

FIG. 3 shows ink compositions and evaluation results of Comparative Examples of the embodiment.

DESCRIPTION OF EMBODIMENTS

Figure 1:
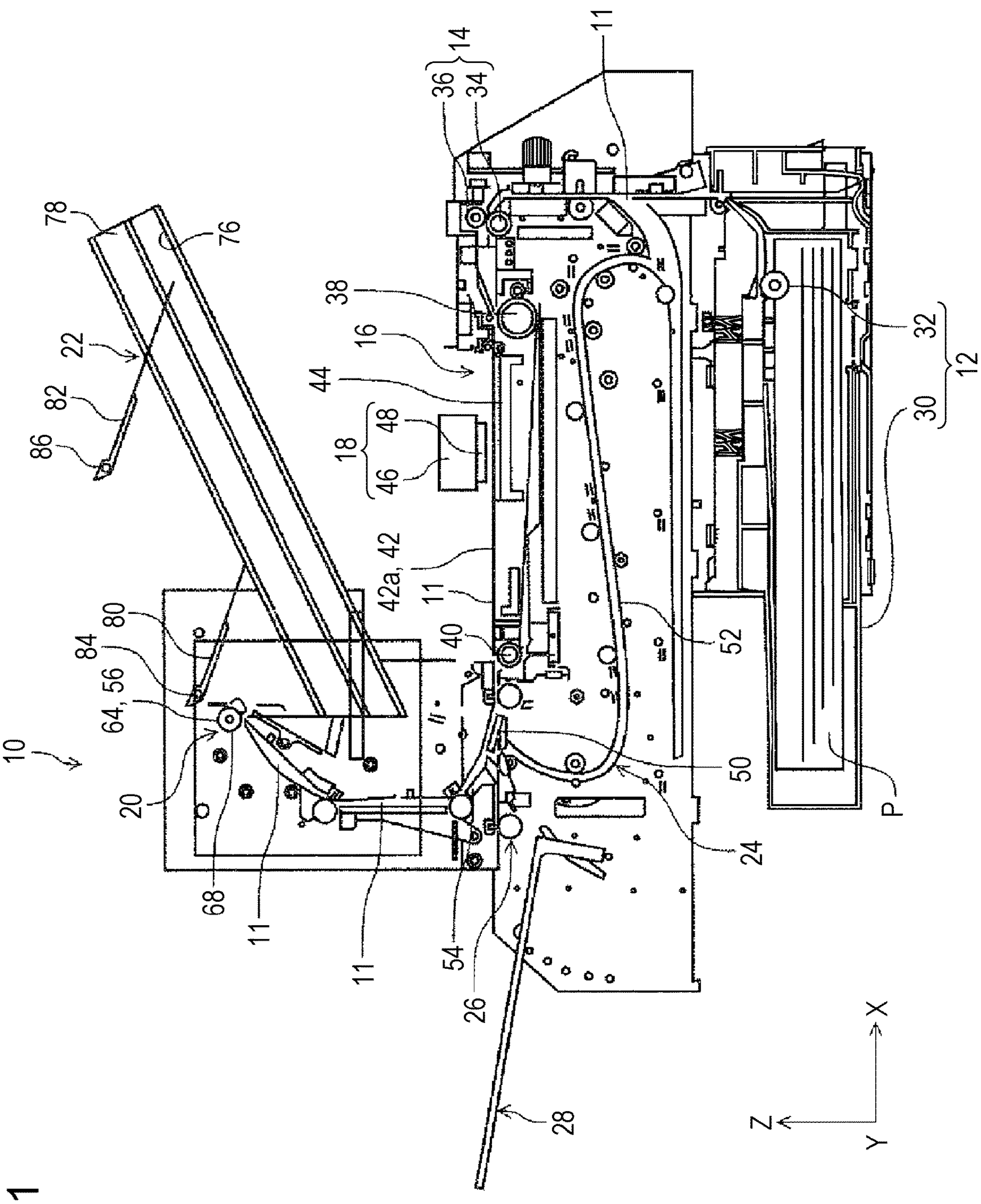
FIG. 1 is a diagram illustrating an example of a recording device used in an embodiment of the present disclosure.

Hereinafter, an embodiment of the present disclosure (hereinafter, referred to as the "present embodiment") will be described in detail. However, the present disclosure is not limited thereto, and can be modified in various ways without departing from the spirit thereof.

1. Ink Jet Ink Composition

An aqueous ink jet ink composition (hereinafter, also referred to simply as the "ink composition") according to the present embodiment includes a color material, an acetylene glycol-based surfactant, glycerin, and a 6-, 7-, or 8-membered lactam, in which the content of the glycerin is 9% by mass or less based on the total mass of the ink composition, and the mass ratio of the content of the 6-, 7-, or 8-membered lactam to the content of the acetylene glycol-based surfactant is 0.5 or more and less than 5.

Organic solvents having high moisture-retaining properties such as glycerin are excellent moisturizing agents, and can suppress occurrence of misdirection and discharge failure (deterioration of intermittency) due to thickening of ink caused when the ink dries in a nozzle. On the other hand, these organic solvents tend to cause curling of a recording medium having been subjected to recording. It is presumed that this tendency is because absorption of ink into a recording medium is promoted by an organic solvent having high moisture-retaining properties, and the absorbed ink is held on the recording medium, leading to delay in drying of water from the recording medium, and curling thus easily occurs and easily remains. Among the organic solvents having high moisture-retaining properties, glycerin is a particularly excellent moisturizing agent and can prevent drying of ink. On the other hand, curling of recording media has been liable to occur. While there are types of curling such as curling that occurs immediately after ink adheres to a recording medium and curling that remains even after ink has dried over time after recording on a recording medium, curling herein may include both curling types. Therefore, occurrence of curling of a recording medium can be suppressed by setting the content of glycerin in ink to a predetermined amount or less. Here, when the content of glycerin in ink is adjusted to a predetermined amount or less, compatibility between water and the acetylene glycol-based surfactant included in the ink decreases. As a result, separation of the acetylene glycol-based surfactant in the ink is observed. Consequently, deterioration of preservation stability of the ink is caused, and deterioration of discharge stability when the ink is discharged from an ink jet head is caused due to a separated component. In particular, the acetylene glycol-based surfactant and water are likely to undergo phase separation when the ink dries in a nozzle in a recording device; as a result, the ink is not discharged from the nozzle, or misdirection is caused even the ink is discharged at the time of discharging the ink, deteriorating discharge stability. In addition, also in a case where the ink jet head is left uncapped for a long time, phase separation of the acetylene glycol-based surfactant is likely to occur similarly.

The acetylene glycol-based surfactant has a function to facilitate penetration and absorption of ink into a recording medium. However, when the acetylene glycol-based surfactant is not sufficiently dissolved in water, this function cannot be sufficiently developed. Therefore, the ink remains on a surface of a recording medium, and the ink attaches to a member of a recording device in a path through which the recording medium is transported, and attaches to another recording medium. Alternatively, the ink directly attaches to another recording medium. In this manner, other recording media are contaminated. This event is also referred to as ink transfer. Such ink transfer of is likely to occur.

When the content of glycerin in ink is a predetermined amount or less, the solubility of the acetylene glycol-based surfactant in water, which is a main solvent component of the ink, is made poor, and the acetylene glycol-based surfactant is easily separated. It is presumed that this is because the moisture-retaining properties of the ink are poor, water easily evaporates from the ink, and the water content in the ink is reduced, or because the solubility of the acetylene glycol-based surfactant in water is low when the content of glycerin is small since the solubility of the acetylene glycol-based surfactant in water is increased when glycerin is present.

Then, it has been found that when a 6-, 7-, or 8-membered lactam is included in ink at a predetermined mass ratio based on the acetylene glycol-based surfactant, the acetylene glycol-based surfactant hardly undergoes phase separation from water, discharge stability is excellent, and ink transfer is successfully suppressed. The 6- to 8-membered lactams improve the solubility of the acetylene glycol-based surfactant in water and successfully suppress ink transfer. Although the 6- to 8-membered lactams also have moisture-retaining properties, curling of a recording medium hardily occurs, and curling is successfully suppressed.

Hereinafter, each component of an ink composition of the present embodiment will be described in detail.

1.1. Color Material

Although a color material is not particularly limited, examples thereof include dyes and pigments. A pigment is preferably used among them from the viewpoints of, for example, a wide range of available recording media and properties of hardly fading even when the pigment is exposed to light, gas, and the like.

Although the pigment is not particularly limited, examples thereof include organic pigments such as an azo pigment (including, for example, azolake, an insoluble azo pigment, a condensed azo pigment, and an azo chelate pigment), a polycyclic pigment (for example, a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment), a nitro pigment, a nitroso pigment, and aniline black; inorganic pigments such as carbon black (for example, furnace black, thermal lamp black, acetylene black, and channel black), a metal oxide, a metal sulfide, and a metal chloride; and extender pigments such as silica, calcium carbonate, and talc. One kind of the pigment may be used singly, or two or more kinds thereof may be used in combination.

Although the pigment is not particularly limited, examples thereof include a self-dispersed pigment in which a hydrophilic group is introduced into a pigment particle surface through chemical reaction, and a resin-dispersed pigment. The resin-dispersed pigment is a pigment dispersed by a resin. The resin used to disperse the pigment is also referred to as a dispersant resin. The dispersant resin means a resin which is applied to a pigment surface in order to improve water dispersibility of the pigment and used. The resin-dispersed pigment is a pigment to which the dispersant resin adheres or attaches or which is covered with the dispersant resin.

A water-soluble resin, a water-insoluble resin, or the like can be used as the dispersant resin. The resin-dispersed pigment can be prepared by, for example, a method of stirring the dispersant resin and the pigment in water to disperse the pigment or a method of stirring the dispersant resin and the pigment in an organic solvent or the like and subsequently subjecting same to phase inversion emulsification to be dispersed in a water phase.

The self-dispersed pigment is a pigment in which a functional group for improving water dispersibility of the pigment is directly or indirectly introduced into a surface of the pigment through chemical bonding. The functional group is a hydrophilic group, and examples thereof include a carboxy group, a sulfo group, and a phosphorus-containing group such as a phosphate group and a phosphono group.

The pigment preferably includes at least one or more of the self-dispersed pigment and the pigment dispersed by the dispersant resin, and it is more preferable that the pigment include the self-dispersed pigment. When the dispersant resin or another dispersant is used, one kind of each dispersant may be used singly, or two or more kinds thereof may be used in combination. A known dye can be used as the dye.

The content of the color material is preferably 0.5% by mass or more based on the total amount of the ink composition. The content of the color material is more preferably 1.0% to 14% by mass, still more preferably 2.0% to 12% by mass, further preferably 4.0% to 10% by mass, and even further preferably 6.0% to 8.0% by mass.

1.2. 6- to 8-Membered Lactams

The ink composition of the present embodiment includes a 6-, 7-, or 8-membered lactam. The ink composition of the present embodiment preferably includes a 6- or 7-membered lactam and more preferably includes a 7-membered lactam.

Lactams mean compounds having a structure in which a ring is formed through dehydration condensation between a carboxy group and an amino group in a molecule.

As described above, when the content of the organic solvent having high moisture-retaining properties in the ink composition is low, in particular, when the content of glycerin in the ink is low, curling is successfully suppressed, but solubility of the acetylene glycol-based surfactant in water is decreased, discharge stability is poor, and ink transfer is poorly suppressed. When the ink composition of the present embodiment includes the 6- or 7-membered lactam, solubility of the acetylene glycol-based surfactant in water is excellent, discharge stability is excellent, ink transfer is successfully suppressed, and curling is also successfully suppressed.

The lactam may have or may not have a substituent in the lactam ring. For example, the lactam may be a derivative having a substituent in the lactam ring thereof.

Although the 7-membered lactam (a compound having a lactam ring composed of 6 carbon atoms) is not particularly limited, examples thereof include ε-caprolactam and a derivative thereof. Among them, from the viewpoint of improving discharge stability and the like, ε-caprolactam is preferably included. Examples of the 6-membered lactam include δ-lactam and a derivative thereof.

The mass ratio of the content of the 6- to 8-membered lactams to the content off the acetylene glycol-based surfactant is 0.5 to 5. The mass ratio is preferably 1.0 to 4.0, more preferably 2.0 to 3.5, and still more preferably 2.5 to 3.0. When the mass ratio is equal to or more than the above ranges, water solubility of the acetylene glycol-based surfactant and anti-transfer properties are made more excellent. When the mass ratio is equal to or less than the above ranges, discharge stability is made more excellent.

The 6- to 8-membered lactams may be a compound which is solid in the simple form thereof at normal temperature. When the content of the 6- to 8-membered lactams is too large, discharge stability may deteriorate due to the 6- to 8-membered lactams themselves, and the 6- to 8-membered lactams are preferably included in a predetermined content or less.

The content of the 6- to 8-membered lactams based on the total mass of the ink composition is preferably 0.1% by mass or more or is preferably 4.0% by mass or less. The content is more preferably 0.5% to 3.5% by mass, still more preferably 1.0% to 3.0% by mass, and further preferably 2.0% to 2.5% by mass. When the content of the 6- to 8-membered lactams based on the total mass of the ink composition falls within the above ranges, the water solubility of the acetylene glycol-based surfactant, anti-transfer properties, and discharge stability are made more excellent.

1.3. Acetylene Glycol-Based Surfactant

When the ink composition includes the acetylene glycol-based surfactant, the ink composition discharged from a nozzle is easily made into droplets and can be continuously and stably discharged well. That is, discharge is stabilized. Discharge failure of the ink from a nozzle and occurrence of misdirection can be prevented thereby. Among surfactants, the acetylene glycol-based surfactant causes less ink foaming, and is excellent in discharge stability and is preferable also in this regard.

In a case where discharge is unstable because the ink composition does not include the acetylene glycol-based surfactant, discharge is likely to be unstable from the beginning regardless of whether the ink dries in a nozzle.

When the ink composition includes the acetylene glycol-based surfactant, wetting and spreading properties and permeability of the ink composition tend to improve, and image quality and color developability tend to become excellent particularly in recording on an absorptive recording medium such as regular paper. In addition, since the ink easily permeates a recording medium, the ink is less likely to remain on the recording medium, and anti-transfer properties of the ink is made excellent.

Although the acetylene glycol-based surfactant is not particularly limited, examples thereof include acetylene glycol and an alkylene oxide adduct thereof. Specifically, the acetylene glycol-based surfactant is represented by formula (1) below.

(1)

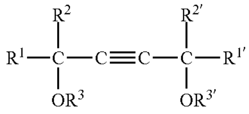

In formula (1) above, $R^1$, $R^{1'}$, $R^2$, and $R^{2'}$ each independently represent a linear or branched alkyl group having 1 to 5 carbon atoms, and $—OR^3$ and $—OR^{3'}$ each independently represent —OH or $—O(C_mH_{2m}O)_nH$. Here, m represents an integer of 1 to 5. In addition, n is 25 or less and represents the average polymerization degree of the alkylene oxide ($C_mH_{2m}O$) added.

The number of carbon atoms of the main chain of the compound represented by formula (1) is preferably 6 to 15, more preferably 8, 10, 12, or 14, still more preferably 10 or 12, and further preferably 10.

The "main chain" herein means the main chain of acetylene glycol defined on the basis of the IUPAC nomenclature. One kind of the acetylene glycol-based surfactant may be used singly, or two or more kinds thereof may be used in combination.

$R^1$ and $R^{1'}$ are each preferably a linear alkyl group having 1 to 5 carbon atoms, more preferably a linear alkyl group having 2 to 4 carbon atoms, and still more preferably a linear propyl group.

$R^2$ and $R^{2'}$ are each preferably a linear alkyl group having 1 to 5 carbon atoms, more preferably a linear alkyl group having 1 to 3 carbon atoms, and still more preferably a methyl group.

Preferably, m is 1 to 4, more preferably 2 to 3, and still more preferably 2. Preferably, n is 20 or less, more preferably 16 or less, and still more preferably 12 or less. Meanwhile, n is preferably 4 to 25, more preferably 6 to 25, and still more preferably 8 to 25.

It is also preferable that either $—OR^3$ or $—OR^{3'}$ be represented by —OH, and it is also preferable that both $—OR^3$ and $—OR^{3'}$ be represented by —OH.

Examples of more specific structures of the acetylene glycol-based surfactant include, but are not particularly limited to, 2,5,8,11-tetramethyl-6-dodecyne-5,8-diol or an alkylene oxide adduct thereof, 5,8-dimethyl-6-dodecyne-5,8-diol or an alkylene oxide adduct thereof, 2,4,7,9-tetramethyl-5-decyne-4,7-diol or an alkylene oxide adduct thereof, and 4,7-dimethyl-5-decyne-4,7-diol or an alkylene oxide adduct thereof.

Among the acetylene glycol-based surfactants, a compound in which $—OR^3$ and $OR^{3'}$ of formula (1) above are —OH provides excellent wetting and spreading properties and permeability of the ink composition on a recording medium, particularly provides excellent image quality, and thus is preferable, but is likely to have particularly poor water solubility. Therefore, the ink composition of the present embodiment is particularly useful.

The content of the acetylene glycol-based surfactant is preferably 5.0% by mass or less based on the total amount of the ink composition. Furthermore, the content of the acetylene glycol-based surfactant is preferably 0.1% to 4.0% by mass, more preferably 0.2% to 3% by mass, still more preferably 0.3% to 2% by mass, and further preferably 0.4% to 1.0% by mass. Furthermore, the content of the acetylene glycol-based surfactant is preferably 0.5% to 0.9% by mass and more preferably 0.6% to 0.8% by mass. When the content of the acetylene glycol-based surfactant is equal to or more than the above ranges, discharge stability tends to improve, and when the content of the acetylene glycol-based surfactant is equal to or less than the above ranges, phase separation of the acetylene glycol-based surfactant in the ink composition is easily prevented, and discharge stability tends to improve. In addition, the mass ratio of the content of the 6-, 7-, or 8-membered lactam to the content of the acetylene glycol-based surfactant is easily set to fall within the above-described ranges, and the above acetylene glycol-based surfactant contents are thus preferable.

An acetylene glycol-based surfactant having an HLB value of 5 or less is preferable among the acetylene glycol-based surfactants. In this case, permeability of the ink composition tends to improve. The HLB value is preferably 0 or more, more preferably 1 to 4, still more preferably 2 to 4, and particularly preferably 3 to 4. The case where the HLB value is equal to or more than the above ranges is preferable because phase separation more hardly occurs, and discharge stability tends to further improve. The case where the HLB value is equal to or less than the above ranges is preferable because ink transfer more hardly occurs. Here, the HLB value is a value representing balance between hydrophobicity and hydrophilicity of a surfactant. A smaller HLB value indicates higher hydrophobicity, and a larger HLB value indicates higher hydrophilicity. In the present disclosure, the HLB value is calculated by the Griffin method.

Although the acetylene glycol-based surfactant having an HLB value of 5 or less is not particularly limited, among acetylene glycol compounds represented by formula (1) above, an acetylene glycol compound in which $—OR^3$ and $—OR^{3'}$ are each independently —OH or $—O(C_mH_{2m}O)_nH$, and n is independently 15 or less is preferable, for example. More preferably, n is 10 or less, and still more preferably 5 or less. An acetylene glycol compound in which $—OR^3$ and $—OR^{3'}$ are —OH in formula (1) above is particularly preferable.

Examples of specific structures of the acetylene glycol-based surfactant having an HLB value of 5 or less include, but are not particularly limited to, 2,4,7,9-tetramethyl-5-decyne-4,7-diol or an alkylene oxide adduct thereof, with the number of moles n of the added alkylene oxide in the adduct being each independently 15 or less.

The content of the acetylene glycol-based surfactant having an HLB value of 5 or less based on the total mass of the ink composition may be set so as to fall within the same ranges as those for the content of the acetylene glycol-based surfactant based on the total mass of the ink composition described above. Furthermore, the content of the acetylene glycol-based surfactant having an HLB value of 5 or less is preferably 0.05% to 0.5% by mass, more preferably 0.1% to 0.4% by mass, and still more preferably 0.2% to 0.3% by mass. The mass ratio of the content of the 6- to 8-membered lactams to the content of the acetylene glycol-based surfactant having an HLB value of 5 or less may be set so as to fall within the same ranges as those for the mass ratio of the content of the 6- to 8-membered lactams to the content of the acetylene glycol-based surfactant described above. Furthermore, the mass ratio is preferably 1.5 to 15, more preferably 2 to 13, and still more preferably 5 to 10. The case where the content and the mass ratio described above fall within the above ranges is preferable because water solubility of the acetylene glycol-based surfactant, discharge stability, suppression of ink transfer, and the like are made more excellent.

The ink composition of the present embodiment may include an acetylene glycol-based surfactant having an HLB value exceeding 5. The case where the acetylene glycol-based surfactant having an HLB value exceeding 5 is included is preferable because water solubility of the acetylene glycol-based surfactant, discharge stability, and the like are made more excellent. In addition, both of the acetylene glycol-based surfactant having an HLB value exceeding 5 and the acetylene glycol-based surfactant having an HLB value of 5 or less may be included. This case is preferable because water solubility of the acetylene glycol-based surfactant, discharge stability, suppression of ink transfer, and the like are particularly excellent. The HLB value of the acetylene glycol-based surfactant is more preferably 6 or more, still more preferably 7 or more, and particularly preferably 8 or more. The upper limit of the HLB value is preferably 14 or less, 13 or less, and 12 or less.

Among acetylene glycol compounds represented by formula (1) above, an acetylene glycol compound in which $—OR^3$ and $—OR^{3'}$ each independently represent $—O(C_mH_{2m}O)_nH$, and n is independently 6 or more is preferable as a specific structure of the acetylene glycol-based surfactant having an HLB value exceeding 5, for example. More preferably, n is 11 or more and still more preferably 16 or more. Examples thereof include, but are not particularly limited to, 5,8-dimethyl-6-dodecyne-5,8-diol or an alkylene oxide adduct thereof, 4,7-dimethyl-5-decyne-4,7-diol or an alkylene oxide adduct thereof, and 2,4,7,9-tetramethyl-5-decyne-4,7-diol or an alkylene oxide adduct thereof, with any of or each of the numbers of moles of the added alkylene oxide in the adduct falling within the above range or more.

The content of the acetylene glycol-based surfactant having an HLB value exceeding 5 based on the total mass of the ink composition may be set so as to fall within the same ranges as those for the content of the acetylene glycol-based surfactant based on the total mass of the ink composition described above. The mass ratio of the content of the 6- to 8-membered lactams to the content of the acetylene glycol-based surfactant having an HLB value exceeding 5 may be set so as to fall within the same ranges as those for the mass ratio of the content of the 6- to 8-membered lactams to the content of the acetylene glycol-based surfactant described above.

The mass ratio of the acetylene glycol-based surfactant having an HLB value of 5 or less to the content (total content) of the acetylene glycol-based surfactant is preferably 0.6 or less, more preferably 0.1 to 0.5, and still more preferably 0.2 to 0.4.

1.4. Glycerin

The ink jet ink composition of the present embodiment includes glycerin, and the content of glycerin is 9% by mass or less based on the total mass of the ink composition. Glycerin has excellent moisture-retaining properties, and when ink includes glycerin, water in the ink is prevented from drying, and discharge stability is made excellent. In addition, water solubility of the acetylene glycol-based surfactant is made excellent, and ink transfer is successfully suppressed. On the other hand, curling easily occurs, and curling is successfully suppressed by setting the content of glycerin in the ink to 9% by mass or less. The content is preferably 0.5% to 7% by mass, more preferably 18 to 5% by mass, and still more preferably 2% to 4% by mass. When the content falls within the above ranges, discharge stability, ink transfer suppression, curling suppression, and the like are made more excellent.

1.5. Resin

The ink jet ink composition of the present embodiment may include a resin. Among resins, since the dispersant resin for dispersing the pigment has been described above, other resins will be described. The case where ink includes a resin is preferable because ink transfer is successfully suppressed. In addition, when ink includes a resin, water solubility of the acetylene glycol-based surfactant can be improved, and ink transfer suppression and discharge stability are made more excellent, as described later. A water-soluble resin, resin particles, or the like can be used as the resin. A water-soluble resin is preferable. The content of the resin in ink is preferably 0.1% to 5% by mass, more preferably 0.2% to 3% by mass, and still more preferably 0.2% to 2% by mass.

1.5.1. Water-Soluble Resin

The resin may be a water-soluble resin and is preferably a water-soluble resin. Although the water-soluble resin is not limited, examples thereof include a urethane resin, an acrylic resin, a polyalkyleneoxide-based resin, a polyvinyl alcohol-based resin, and a carboxymethylcellulose-based resin. Among them, a urethane resin and an acrylic resin are preferable, and a urethane resin is more preferable.

The "water-soluble resin" in the present disclosure is a resin soluble in an aqueous media, which is water or a solvent mixture of water and a water-soluble organic solvent. In particular, the "water-soluble resin" is a resin soluble in water. Specifically, the "water-soluble resin" refers to a resin that, when 18 by mass of the resin is mixed with water at normal temperature and stirred, leaves no undissolved residue and does not cause the mixture liquid to appear cloudy as a whole. The water-soluble resin is preferably a resin capable of existing in water or an aqueous media, especially in water, in a state where the particle diameter thereof cannot be measured by dynamic light scattering measurement. In addition, the water-soluble resin is included in ink in a state of being dissolved in a solvent component of the ink.

A water-soluble urethane resin means a urethane resin which has a polar group within the molecular structure thereof and is dissolved in water. The polar group may be in a form of a salt. In addition, the polar group is preferably an acid group. Examples of the acid group include a carboxy group, a sulfonic acid group, and a phosphorus-containing group such as a phosphate group.

As described above, when the ink composition includes the acetylene glycol-based surfactant, since the acetylene glycol-based surfactant has low solubility in water and the like, the acetylene glycol-based surfactant undergoes phase separation and separated from water as drying of the ink composition progresses, and intermittency and clogging recovery performance tend to deteriorate. However, when the ink includes the water-soluble resin, the above-described phase separation is more successfully prevented.

The water-soluble urethane resin has repeating units derived from a polyisocyanate and a polyol. Among them, a resin having a repeating unit derived from a polyol having an acid group is preferable, and a resin having repeating units respectively derived from a polyisocyanate, a polyol having no acid group, and a polyol having an acid group is preferable. The water-soluble urethane resin may further have a repeating unit derived from a polyamine.

A polyisocyanate means a compound having two or more isocyanate groups within the molecular structure thereof, and examples thereof include, but are not particularly limited to, an aliphatic polyisocyanate and an aromatic polyisocyanate.

Although the aliphatic polyisocyanate is not particularly limited, examples thereof include a polyisocyanate having a chain structure such as tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate; and a polyisocyanate having a cyclic structure such as isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanatemethyl)cyclohexane.

Although the aromatic polyisocyanate is not particularly limited, examples thereof include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and $\alpha,\alpha,\alpha',\alpha'$-tetramethylxylylenediisocyanate.

A polyol is a compound having two or more hydroxy groups within the molecular structure thereof. Although the polyol of the present embodiment is not particularly limited, examples thereof include a polyol having no acid group and a polyol having an acid group.

Although the polyol having no acid group is not particularly limited, examples thereof include a polyether polyol, a polyester polyol, and a polycarbonate polyol.

Although the polyether polyol is not particularly limited, examples thereof include addition polymers of alkylene oxides and polyols, and glycols.

Examples of the alkylene oxides include, but are not particularly limited to, ethylene oxide, propylene oxide, butylene oxide, and $\alpha$-olefin oxide. Examples of the polyols to be subjected to addition polymerization with the alkylene oxides include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, and dimethylolurea and derivatives thereof; and triols such as glycerin, trimethylolpropane, 1,2,5-hexanetriol, 1,2,6-hexanetriol, pentaerythritol, trimethylolmelamine and derivatives thereof, a polyoxypropylenetriol.

Examples of the glycols include (poly)alkylene glycols such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, and (poly)tetramethylene glycol; and ethylene glycol-propylene glycol copolymers.

Although the polyester polyol is not particularly limited, examples thereof include an acid ester. Although the acid component constituting the acid ester is not particularly limited, examples thereof include aromatic dicarboxylic acids such as phthalic acid, naphthalene dicarboxylic acid, biphenyl dicarboxylic acid, and tetrahydrophthalic acid; alicyclic dicarboxylic acids such as hydrogenated products of the aromatic dicarboxylic acids; and aliphatic dicarboxylic acids such as malonic acid, succinic acid, tartaric acid, oxalic acid, glutaric acid, adipic acid, pimelic acid, suberic acid, azelaic acid, sebacic acid, alkylsuccinic acid, linoleic acid, maleic acid, fumaric acid, mesaconic acid, citraconic acid, and itaconic acid. Anhydrides, salts, derivatives (alkyl esters, acid halides), and the like thereof can also be used as the acid component. Although the component forming an ester with the acid component is not particularly limited, examples thereof include polyols such as diols and triols; and glycols such as (poly)alkylene glycols. Examples of the polyols and glycols include those exemplified as components constituting the above-described polyether polyol.

The polycarbonate polyol is not particularly limited, and a polycarbonate polyol produced by a known method can be used, for example. Specific examples thereof include alkanediol-based polycarbonate diols such as polyhexamethylene carbonate diol as well as a polycarbonate diol obtained by reacting a carbonate component such as an alkylene carbonate, a diaryl carbonate, or a dialkyl carbonate or phosgene with an aliphatic diol component.

Although the polyol having an acid group is not particularly limited, examples thereof include a polyol having an acid group such as a carboxylic acid group, a sulfonic acid group, a phosphate group, or a phosphonic acid group. Among them, one or more kinds of a carboxy group, a sulfonic acid group, and a phosphorus-containing group such as a phosphate group are preferable, and a carboxy group is more preferable.

Although the polyol having a carboxylic acid group is not particularly limited, examples thereof include dimethylolacetic acid, dimethylol propionic acid, dimethylol butanoic acid, and dimethylol butyric acid.

The acid group of the polyol having an acid group may be in a salt state. Although the cation forming such a salt is not particularly limited, examples thereof include an alkali metal ion and an organic ammonium cation. Although the alkali metal ion is not particularly limited, examples thereof include ions of lithium, sodium, and potassium. Although the organic ammonium cation is not particularly limited, examples thereof include an ammonium ion and a dimethylammonium ion.

Although the polyamine is not particularly limited, examples thereof include monoamines having a plurality of hydroxy groups such as dimethylolethylamine, diethanolmethylamine, dipropanolethylamine, and dibutanolmethylamine; bifunctional polyamines such as ethylenediamine, propylenediamine, hexylenediamine, isophoronediamine, xylylenediamine, diphenylmethanediamine, hydrogenated diphenylmethanediamine, and hydrazine; and polyamines having three or more functional groups such as diethylenetriamine, triethylenetetramine, tetraethylenepentamine, polyamidepolyamine, and polyethylenepolyimine.

The acid value of the water-soluble urethane resin is preferably 40 to 100 mgKOH/g, more preferably 40 to 90 mgKOH/g, still more preferably 45 to 80 mgKOH/g, and further preferably 50 to 70 mgKOH/g. Although not particularly limited, the acid value of the water-soluble urethane resin can be adjusted by the used amount of the polyol having an acid group, for example. As a method for measuring the acid value, the method in the examples described later can be used.

The weight average molecular weight of the water-soluble urethane resin is preferably 5000 to 150000, more preferably 10000 to 100000, still more preferably 15000 to 50000, further preferably 20000 to 30000, and further preferably 20000 to 23000. When the weight average molecular weight falls within the above ranges, discharge reliability tends to further improve. Although not particularly limited, the weight average molecular weight of the water-soluble urethane resin can be adjusted by the temperature or time for the reaction between the polyisocyanate and the polyol, for example. As a method for measuring the weight average molecular weight, the method in the examples described later can be used.

The number average molecular weight of the water-soluble urethane resin is preferably 2000 to 7000 and more preferably 3500 to 5000. When the number average molecular weight falls within the above ranges, discharge reliability tends to further improve. Although not particularly limited, the number average molecular weight of the water-soluble urethane resin can be adjusted by the temperature or time for the reaction between the polyisocyanate and the polyol, for example. As a method for measuring the number average molecular weight, the method in the examples described later can be used.

The water-soluble acrylic resin includes those having the same structure as the acrylic resin for resin particles described later. However, it is preferable that the content of a hydrophilic group in a molecule be increased in order to make the resin water soluble. Examples of the hydrophilic group include an acid group, a polyoxyalkylene group, and a hydroxy group.

The range of the content of the water-soluble resin is the same as that of the content of the resin described above. In particular, the content of the water-soluble resin is preferably 0.05% by mass or more and more preferably 0.1% to 5.0% by mass based on the total amount of the ink composition. Furthermore, the content of the water-soluble resin is preferably 0.1% to 4.0% by mass, more preferably 0.2% to 3.0% by mass, still more preferably 0.3% to 2.0% by mass, further preferably 0.3% to 1.0% by mass, and further preferably 0.4% to 0.8% by mass. When the content of the water-soluble resin falls within the above ranges, the water solubility of the acetylene glycol-based surfactant, discharge stability, ink transfer suppression, and the like are made more excellent.

1.5.2. Resin Particles

The resin may be resin particles. The resin particles are not water soluble and are dispersed in a solvent in ink. An example thereof is resin emulsion. Phase separation of the acetylene glycol-based surfactant from water is more successfully prevented also in the case where the resin is resin particles similar to the case of the water-soluble resin described above.

Examples of the resin particles include, but are not particularly limited to, resin particles formed from a urethane-based resin, an acrylic resin, a fluorene-based resin, a polyolefin-based resin, a rosin-modified resin, a terpene-based resin, a polyester-based resin, a polyamide-based resin, an epoxy-based resin, a vinyl chloride resin, an ethylene vinyl acetate resin, or the like. These resin particles are preferably in an emulsion form from the viewpoints of intermittency and clogging recovery performance. One kind of the dispersed resin particles may be used singly, or two or more kinds thereof may be used in combination. A urethane-based resin, an acrylic resin, and a polyester-based resin are preferable, and a urethane-based resin and an acrylic resin are more preferable.

The term "urethane-based resin" is a collective term for resins having a urethane bond, and examples thereof include, but are not particularly limited to, a polyether-type urethane resin having an ether bond in the main chain thereof, a polyester-type urethane resin having an ester bond in the main chain thereof, and a polycarbonate-type urethane resin having a carbonate bond in the main chain thereof. The urethane-based resin may be a prepared product prepared by a known method, or may be a commercially available product.

The term "acrylic resin" is a collective term for polymers obtained by polymerizing, as one component, at least an acrylic monomer such as (meth)acrylic acid and a (meth)acrylate. Although the acrylic resin is not particularly limited, examples thereof include a resin obtained by polymerizing a (meth)acrylic monomer such as (meth)acrylic acid or a (meth)acrylate, and a resin obtained by copolymerizing a (meth)acrylic monomer and another monomer such as a styrene-acrylic resin. The acrylic resin may be a prepared product prepared by a known method, or may be a commercially available product.

The case where the resin is the resin particles is preferable similarly to the case of the water-soluble resin. The content of the resin particles in the ink may be in the same range as the content of the resin or the water-soluble resin described above. The glass transition point of the resin of the resin particles is preferably −50° C. to 70° C., more preferably −10° C. to 50° C., and still more preferably 0° C. to 40° C. When the glass transition point is equal to or more than the above ranges, discharge stability is made more excellent, and when the glass transition point is equal to or less than the above ranges, the ink transfer is more successfully suppressed, which are preferable.

1.6. Betaine

The term "betaine" refers to a compound having a positive charge and a negative charge at non-adjacent positions in the same molecule, in which a hydrogen atom capable of dissociating is not bonded to the atom having the positive charge, constituting an intramolecular salt, and the compound is not charged as a whole molecule. In the present embodiment, the betaine preferably has a quaternary ammonium cation as the positively charged moiety.

When the ink composition includes the betaine, it is possible to prevent misdirection and discharge failure of the ink composition caused when the ink composition dries in a nozzle of an ink jet head, and intermittency tends to become excellent. Intermittency is a degree of occurrence of discharge failure and misdirection caused during recording or the like due to progression of drying of ink in a nozzle that has not discharged ink, resulting in thickening of the ink.

Although the betaine is not particularly limited, examples thereof include trimethylglycine, γ-butyrobetaine, homarine, trigonelline, carnitine, homoserine betaine, valine betaine, lysine betaine, ornithine betaine, alanine betaine, stachydrin, and glutamic acid betaine. Among them, it is preferable to include any one or more of trimethylglycine, γ-butyrobetaine, and carnitine, and it is more preferable to include any one or more of trimethylglycine and γ-butyrobetaine. Consequently, clogging recovery performance tends to further improve. One kind of the betaine may be used singly, or two or more kinds thereof may be used in combination.

The number of carbon atoms constituting the betaine is preferably 4 to 12, more preferably 4 to 7, and still more preferably 4 to 6. When the number of carbon atoms constituting the betaine falls within the above ranges, stability against, for example, contamination of charging foreign matter tends to further improve.

The content of the betaine is preferably 1.0% by mass or more based on the total amount of the ink composition. Furthermore, the content of the betaine is preferably 3.0% to 13% by mass, more preferably 5.0% to 10% by mass, still more preferably 6.0% to 9.0% by mass, and further preferably 6.0% to 8.0% by mass. When the content of the betaine is 3.0% by mass or more, discharge stability and curling resistance tend to become excellent, and when the content of the betaine is 13% by mass or less, phase separation of the acetylene glycol-based surfactant in the ink composition can be suppressed, and clogging recovery performance tends to become excellent.

1.7. Inorganic Oxide Particle

The ink composition of the present embodiment may include or may not include inorganic oxide particles. The inorganic oxide particles mean fine particles of an inorganic oxide dispersed in a dispersion medium.

When the ink composition includes inorganic oxide particles, curling resistance tends to become more excellent. In addition, when the ink composition includes both the betaine and the inorganic oxide particles, curling resistance tends to become especially excellent. On the other hand, from the point that discharge stability is more excellent, it is preferable that the content of the inorganic oxide particles be small, and it is more preferable that the inorganic oxide particles be not included.

Examples of the inorganic oxide particles include, but are not particularly limited to, metal oxides such as silica, alumina, titania, zirconia, antimony oxide, tin oxide, tantalum oxide, zinc oxide, cerium oxide, lead oxide, and indium oxide; metal nitrides such as silicon nitride, titanium nitride, and aluminum nitride; metal carbides such as silicon carbide and titanium carbide; metal sulfides such as zinc sulfide; carbonates of metals such as calcium carbonate and magnesium carbonate; sulfates of metals such as calcium sulfate and magnesium sulfate; silicates of metals such as calcium silicate and magnesium silicate; phosphates of metals such as calcium phosphate; borates of metals such as aluminum borate and magnesium borate; and composites thereof. The inorganic oxide particles may form a salt. One kind of the inorganic oxide particles may be used singly, or two or more kinds thereof may be used in combination.

Among them, from the viewpoint of improving curling resistance, it is preferable to include any one or more of silica, alumina, titania, and zirconia, and it is more preferable to include silica.

The average particle diameter of the inorganic oxide particles is preferably 100 nm or less, more preferably 20 to 100 nm, still more preferably 30 to 80 nm, and further preferably 40 to 60 nm. When the average particle diameter of the inorganic oxide particles falls within the above range, intermittency tends to become excellent.

The average particle diameter of the inorganic oxide particles can be measured by a particle size distribution measurement device using a dynamic light scattering method as the measurement principle. Although such a particle size distribution measurement device is not particularly limited, examples thereof include "zeta potential, particle size, and molecular weight measuring system ELSZ2000ZS" (trade name) manufactured by Otsuka Electronics Co., Ltd., which employs a homodyne optical system as a frequency analysis method. The average particle diameter means an average particle diameter on a number basis.

The content of the inorganic oxide particles is preferably 8.0% by mass or less (the content does not exceed 8.0% by mass) based on the total amount of the ink composition in terms of solid mass. The content of the inorganic oxide particles is more preferably 5.0% by mass or less, still more preferably 4.0% by mass or less, and especially preferably 2.0% by mass or less. Furthermore, the content of the inorganic oxide particles is preferably 1% by mass or less, more preferably 0.5% by mass or less, and still more preferably 0.1% by mass or less. The lower limit thereof is 0% by mass or more, and the inorganic oxide particles may not be included.

On the other hand, the content of the inorganic oxide particles is preferably 0.18 by mass or more, more preferably 0.5% by mass or more, still more preferably 1.0% by mass or more, and especially preferably 2.0% by mass or more. When the content of the inorganic oxide particles is equal to or more than the above ranges, curling resistance tends to improve. On the other hand, the case where the content of the inorganic oxide particles is equal to or less than the above ranges is preferable because discharge stability is made more excellent.

1.8. Organic Solvent

The ink composition of the present embodiment may include an organic solvent. Although the organic solvent is not particularly limited, examples thereof include monohydric alcohols, polyols, and glycol ethers. Among them, it is more preferable to include a polyol, and it is still more preferable to include a polyol having a standard boiling point of higher than 280° C. One kind of the organic solvent may be used singly, or two or more kinds thereof may be used in combination. Above-described glycerin is also one of the polyol organic solvents.

Examples of the monohydric alcohols include, but are not particularly limited to, methanol, ethanol, 1-propanol, isopropanol, 1-butanol, 2-butanol, isobutanol, and 2-methyl-2-propanol.

Examples of the glycol ethers include, but are not particularly limited to, triethylene glycol monomethyl ether, triethylene glycol dimethyl ether, triethylene glycol monobutyl ether, diethylene glycol monobutyl ether, and dipropylene glycol monopropyl ether.

Polyols are a compound having a structure in which a hydrocarbon which may have an alkylene oxide structure in the molecule thereof is substituted with two or more hydroxy groups. Examples thereof include alkane polyols of alkanediol or higher alkane polyols, a compound in which intermolecular hydroxy groups of two alkane polyols are condensed with each other, a compound in which alkanes are organized in a (poly)alkylene oxide structure.

Among the polyols, examples of the polyol having a standard boiling point of higher than 280° C. include, but are not particularly limited to, triethylene glycol, tetraethylene glycol, and glycerin. Examples of a polyol having a standard boiling point of 280° C. or lower include, but are not particularly limited to, ethylene glycol, diethylene glycol, pentaethylene glycol, propylene glycol, dipropylene glycol, tripropylene glycol, 1,3-propanediol, 1,2-butanediol, 1,2-pentanediol, 1,2-hexanediol, 1,4-butanediol, 1,5-pentanediol, and 1,6-hexanediol.

Among organic solvents, the polyol having a standard boiling point of higher than 280° C. has high moisture-retaining properties and excellent ink discharge stability. In addition, the polyols having a standard boiling point of higher than 280° C. are preferable because the water solubility of the acetylene glycol-based surfactant is increased, and phase separation of the acetylene glycol-based surfactant is suppressed. On the other hand, curling tends to easily occur.

The content of the polyol having a standard boiling point of higher than 280° C. in ink is preferably 25% by mass or less, more preferably 0.5% to 23% by mass, still more preferably 1.0% to 20% by mass, and especially preferably 5.0% to 15.0% by mass. Furthermore, the content of the polyol having a standard boiling point of higher than 280° C. is preferably 10.0% to 15.0% by mass. Meanwhile, a content of 10.0% by mass or less is also preferable.

The case where the content of the polyol having a standard boiling point of higher than 280° C. in ink is equal to or less than the above ranges is preferable because curling is more successfully suppressed. The case where the content is equal to or more than the above ranges is preferable because discharge stability and water solubility of the acetylene glycol-based surfactant are made more excellent.

The content of the polyol having a standard boiling point of 280° C. or lower is preferably 0.5% to 20% by mass. The case where the content falls within the above range is preferable because discharge stability is made more excellent. The content of the organic solvent is preferably 1.0% to 30% by mass, more preferably 5.0% to 25% by mass, and still more preferably 10% to 20% by mass based on the total amount of the ink jet ink composition.

1.9. Alkali

The ink composition of the present embodiment may include an alkali. Although the alkali is not particularly limited, examples thereof include an organic base and an inorganic base. Although the organic base is not particularly limited, examples thereof include triethanolamine, diethanolamine, monoethanolamine, and tripropanolamine. Although the inorganic base is not particularly limited, examples thereof include lithium hydroxide, sodium hydroxide, and potassium hydroxide.

The content of the alkali is preferably 0.01% to 1.0% by mass, more preferably 0.01% to 0.5% by mass, still more preferably 0.05% to 0.5% by mass, and further preferably 0.1% to 0.5% by mass based on the total amount of the ink jet ink composition.

1.10. Water

Although the kind of water included in the ink composition of the present embodiment is not particularly limited, examples thereof include ion-exchanged water, ultrafiltration water, reverse osmosis water, and distilled water.

The ink of the present embodiment is an aqueous ink composition, in which at least water is included as a main component of the solvent component included in the ink.

The content of water is preferably 50.0% by mass or more, more preferably 50.0% to 98.0% by mass based on the total amount of the ink composition. Furthermore, the content of water is preferably 52.5% to 72.5% by mass, more preferably 55% to 70% by mass, still more preferably 57.5% to 67.5% by mass, and further preferably 60% to 65% by mass.

1.11. Other Components

The ink composition of the present embodiment may contain other known components that can be used in existing ink compositions in addition to the above-described components. Examples of the other components include, but are not particularly limited to, a dissolution aid, a viscosity modifier, a pH modifier, an antioxidant, a preservative, a corrosion inhibitor, a chelating agent for capturing predetermined metal ions affecting dispersion, other additives, and an organic solvent other than those described above. One kind of the other components may be used singly, or two or more kinds thereof may be used in combination.

2. Recording Medium

Although the recording medium used for recording with the ink composition of the present embodiment is not particularly limited, examples thereof include an absorptive recording medium, a low-absorptive recording medium, and a non-absorptive recording medium. Among them, an absorptive recording medium is preferable.

Although the absorptive recording medium is not particularly limited, examples thereof include regular paper such as electrophotographic paper, ink jet paper (exclusive paper for ink jet printing, provided with an ink absorptive layer composed of silica particles or alumina particles or with an ink absorptive layer composed of a hydrophilic polymer such as polyvinyl alcohol (PVA) or polyvinyl pyrrolidone (PVP)), which have high ink permeability. Fabric can also be used.

Although the low-absorptive recording medium is not particularly limited, examples thereof include art paper, coated paper, and cast paper, which have relatively low ink permeability and are used for general offset printing.

Although the non-absorptive recording medium is not particularly limited, examples thereof include films and plates of plastic such as polyvinyl chloride, polyethylene, polypropylene, polyethylene terephthalate (PET), polycarbonate, polystyrene, and polyurethane; plates of metal such as iron, silver, copper, and aluminum; metal plates produced through vapor deposition of such various kinds of metal, plastic films, and plates of alloy such as stainless steel and brass; and recording media in which a film of plastic such as polyvinyl chloride, polyethylene, polypropylene, polyethylene terephthalate (PET), polycarbonate, polystyrene, or polyurethane is adhered (coated) onto a paper base material. The present embodiment is ink capable of being used for recording onto the above-described recording media and thus is preferable. In particular, although curling easily occurs in the case of ink used for recording onto an absorptive recording medium, since curling is successfully suppressed in the case of the present embodiment, and the present embodiment is thus especially useful.

3. Recording Method

A recording method of the present embodiment includes an ink adhering step of discharging, from an ink jet head, the ink composition of the present embodiment and adhering same to a recording medium. In addition, the recording method of the present embodiment may include other steps such as a transporting step of transporting the recording medium, if needed.

3.1. Ink Adhering Step

In the ink adhering step, the ink composition of the present embodiment is discharged from an ink jet head and adhered to a recording medium. More specifically, a pressure generator provided inside an ink jet head is driven to discharge, from a nozzle, the ink composition filling a pressure generation chamber of the ink jet head.

The ink jet head used in the ink adhering step includes a line head for recording in a line recording method, a serial head for recording in a serial recording method, and the like.

In the line recording method using a line head, an ink jet head (line head) having a width equal to or more than the recording width of the recording medium is fixed to a recording device, for example. Then, the recording medium is moved along the vertical scanning direction (recording medium transport direction), and ink droplets are discharged from a nozzle of the ink jet head in conjunction with this movement to record an image on the recording medium through scanning once. Scanning is a movement in which ink is discharged from the ink jet head while relatively changing the positions of a recording medium and the ink jet head to adhere the ink to the recording medium. The line recording method is useful because recording can be continuously performed on multiple sheets of the recording medium at high speed, and recording speed is high. On the other hand, the time from when the ink adheres to the recording medium to when the ink on the recording medium comes into contact with a member of a recording medium transport path in the recording device is relatively short, and the time until the recorded recording medium is stacked on a paper output tray is also relatively short. Therefore, ink transfer is particularly likely to occur; however, when the ink of the present embodiment is used, ink transfer can be suppressed, which is particularly useful.

In the serial recording method using a serial head, an ink jet head is mounted to a carriage capable of moving in the width direction of the recording medium, for example. Then, the carriage is moved along the main scanning direction (width direction of the recording medium), and ink droplets are discharged from a nozzle of the ink jet head in conjunction with this movement to record an image on the recording medium.

3.2. Transporting Step

The ink jet recording method of the present embodiment may include a transporting step. In the transporting step, the recording medium is transported in a predetermined direction within the recording device. More specifically, the recording medium is transported from a paper feeder to a paper discharger of the recording device using a transporting roller and a transporting belt provided within the recording device. The ink composition discharged from the ink jet head is adhered to the recording medium during this transporting process to form a recorded material. The ink adhering step and the transporting step may be simultaneously conducted or may be alternately conducted.

4. Recording Device

A recording device according to the present embodiment includes: an ink jet head having a nozzle that discharges ink jet ink onto a recording medium; and a transporter that transports the recording medium. The ink jet head includes a pressure chamber to which ink is supplied and a nozzle that discharges the ink. In addition, the transporter is composed of a transporting roller and a transporting belt provided in the recording device.

Hereinafter, an example of the recording device according to the present embodiment will be described with reference to FIG. 1. In the X-Y-Z coordinate system shown in FIG. 1, the X direction indicates the length direction of the recording medium, the Y direction indicates the width direction of the recording medium in the transport path in the recording device, and the Z direction indicates the device height direction.

A recording device 10 as an example is a line recording ink jet printer capable of performing high-speed and high-density printing. The recording device 10 includes a feeding unit 12 that houses a recording medium P such as a paper sheet, a transporting unit 14, a belt transporting unit 16, a recording unit 18, a Fd (face-down) discharging unit 20 as a "discharging unit," a Fd (face-down) mounting unit 22 as a "mounting unit," a reverse path unit 24 as a "reverse transporting mechanism," a Fu (face-up) discharging unit 26, and a Fu (face-up) mounting unit 28.

The feeding unit 12 is disposed in a lower portion of the recording device 10. The feeding unit 12 includes a feeding tray 30 that houses the recording medium P, and a feeding roller 32 that feeds the recording medium P housed in the feeding tray 30 to the transport path 11.

The recording medium P housed in the feeding tray 30 is fed to the transporting unit 14 along the transport path 11 by the feeding roller 32. The transporting unit 14 includes a driving transporting roller 34 and a driven transporting roller 36. The driving transporting roller 34 is rotationally driven by a driving source (not shown). In the transporting unit 14, the recording medium P is nipped between the driving transporting roller 34 and the driven transporting roller 36, and is transported to the belt transporting unit 16 located on the downstream side of the transport path 11.

The belt transporting unit 16 includes a first roller 38 located on the upstream side in the transport path 11, a second roller 40 located on the downstream side, an endless belt 42 rotatably attached to the first roller 38 and the second roller 40, and a support 44 that supports an upper section 42*a* of the endless belt 42 between the first roller 38 and the second roller 40.

The endless belt 42 is driven to move from the +X direction to the −X direction in the upper section 42*a* by the first roller 38 or the second roller 40 driven by a driving source (not shown). Therefore, the recording medium P transported from the transporting unit 14 is further transported to the downstream side of the transport path 11 in the belt transporting unit 16.

The recording unit 18 includes a line-type ink jet head 48 and a head holder 46 that holds the ink jet head 48. The recording unit 18 may be of a serial type in which an ink jet head is provided to a carriage that is reciprocated in the Y-axis direction. The ink jet head 48 is disposed so as to face the upper section 42*a* of the endless belt 42 supported by the support 44. When the recording medium P is transported in the upper section 42*a* of the endless belt 42, the ink jet head 48 discharges ink toward the recording medium P to perform recording. The recording medium P is transported to the downstream side of the transport path 11 by the belt transporting unit 16 while recording is performed.

Note that the line-type ink jet head (line head) is provided such that a region of a nozzle formed in a direction intersecting with the transport direction of the recording medium P can entirely cover a recording region in the intersecting direction of the recording medium P, and used in a recording device in which either the head or the recording medium P is fixed and the other is moved to form an image. The region of the nozzle in the intersecting direction of the line head may not entirely cover the intersecting direction of all types of the recording medium P compatible with the recording device.

A first branching unit 50 is provided on the downstream side of the transport path 11 of the belt transporting unit 16. The first branching unit 50 is configured to be switchable between the transport path 11 that transports the recording medium P to the Fd discharging unit 20 or the Fu discharging unit 26, and a reverse path 52 of the reverse path unit 24 that transports the recording medium P to the recording unit 18 again, with the recording surface of the recording medium P reversed. Incidentally, the recording surface of the recording medium P which is switched to the reverse path 52 by the first branching unit 50 and transported is reversed in the transporting process in the reverse path 52, and the recording medium P is transported to the recording unit 18 again so that the surface opposite to the initial recording surface faces the ink jet head 48.

A second branching unit 54 is further provided on the downstream side of the first branching unit 50 along the transport path 11. The second branching unit 54 is configured such that the transport direction of the recording medium P can be switched so as to transport the recording medium P toward the Fd discharging unit 20 or transport the recording medium P toward the Fu discharging unit 26.

The recording medium P transported toward the Fd discharging unit 20 in the second branching unit 54 is discharged from the Fd discharging unit 20 and mounted on the Fd mounting unit 22. At this time, the recording medium P is mounted such that the recording surface thereof faces the Fd mounting unit 22. The recording medium P transported toward the Fu discharging unit 26 in the second branching unit 54 is discharged from the Fu discharging unit 26 and mounted on the Fu mounting unit 28. At this time, the recording medium P is mounted such that the recording surface thereof faces the side opposite to the Fu mounting unit 28.

In the case where the recording device is a serial printer, an ink jet head having a length smaller than the width of the recording medium is provided, the ink jet head moves, and recording is performed with multiple passes (multipass). In addition, in a serial printer, the head is mounted to a carriage that moves in a predetermined direction, and the ink composition is discharged onto the recording medium as the ink jet head moves with movement of the carriage. Recording is thus performed with two or more passes (multipass). Incidentally, the pass is also referred to as scanning or main scanning. Vertical scanning transporting the recording medium is performed between passes. That is, main scanning and vertical scanning are alternately performed.

EXAMPLES

Hereinafter, the present disclosure will be more specifically described using examples and comparative examples. The present disclosure is not limited to the following examples.

1. Preparation of Ink Jet Ink Composition

Components were put into a mixture tank so as to achieve each of the compositions shown in the tables, followed by mixing, stirring, and filtering with a membrane filter to obtain an ink jet ink composition of each of the examples and the comparative examples. Incidentally, the numerical values for the respective components shown in the tables for each example are represented by mass unless otherwise stated. In addition, the contents (mass %) of the pigment, the resin, and the inorganic oxide particles in the tables are solid concentrations.

The ratio of specific lactam/surfactant is the mass ratio of 6-, 7-, or 8-membered lactam/acetylene glycol-based surfactant.

The materials shown in the tables are as follows.

Color Material

CAB-O-JET300 (manufactured by Cabot Corporation, solid content: 15%, self-dispersed pigment)

Dispersed Resin Particles

Dispersed resin particles 1: X-436 (manufactured by SEIKO PMC CORPORATION, Tg: 33° C., acid value: 33 mgKOH/g, styrene-acrylic resin emulsion)

Dispersed resin particles 2: styrene-acrylic resin emulsion was prepared using styrene and an acrylic monomer (Tg: 10° C., acid value was 33 mgKOH/g).

Water-Soluble Urethane Resin

Water-soluble urethane resin 1: water-soluble urethane resin 1 was prepared by the following method. First, a four-necked flask equipped with a stirrer, a thermometer, a nitrogen gas introduction pipe, and a reflux pipe was prepared. Into the four-necked flask were put 41.7 parts by weight of isophorone diisocyanate, 40.1 parts by weight of polypropylene glycol (number average molecular weight: 2,000), 13.2 parts by weight of dimethylol propionic acid, and 200.0 parts by weight of methyl ethyl ketone, and reaction (primary reaction) was carried out at 80° C. for 6 hours in a nitrogen gas atmosphere. Thereafter, 0.6 parts by weight of ethylenediamine, 2.0 parts by weight of methanol, 2.4 parts by weight of dimethylol propionic acid, and 100.0 parts by weight of methyl ethyl ketone were added. The ratio of residual isocyanate groups was confirmed by FT-IR, and the reaction was continued at 80° C. until a desired residual ratio was obtained to obtain a reaction solution (secondary reaction). After the obtained reaction solution was cooled to 40° C., ion-exchanged water was added, and an aqueous potassium hydroxide solution was added while stirring at high speed with a homomixer. Methyl ethyl ketone was distilled off from the obtained liquid through heating under reduced pressure to obtain a liquid containing water-soluble urethane resin 1. Hydrochloric acid was added to the liquid containing water-soluble urethane resin 1 to precipitate the water-soluble urethane resin, the resin having been vacuum-dried at 40° C. overnight was then dissolved in tetrahydrofuran to prepare a sample, and the acid value of water-soluble urethane resin 1 was measured by potentiometric titration using a potassium hydroxide-methanol titration solution and found to be 65 mgKOH/g. The weight average molecular weight in terms of polystyrene of water-soluble urethane resin 1 obtained was measured by gel permeation chromatography (GPC) and found to be about 21000.

Water-Soluble Urethane Resin 2

Water-soluble urethane resin 2 was prepared in the same manner as in the preparation of water-soluble urethane resin 1 except that the addition amount of polypropylene glycol was reduced and the addition amount of dimethylol propionic acid in the primary reaction and the secondary reaction was increased in the preparation of water-soluble urethane resin 1. The acid value and the weight average molecular weight of water-soluble urethane resin 2 were measured by the same measurement methods as those for water-soluble urethane resin 1 and were found to be 75 mgKOH/g and about 21000, respectively.

Inorganic Oxide Particles

- "Cataloid SI-45P" (manufactured by JGC Catalysts and Chemicals Ltd., silica particle dispersion sol, average particle diameter: 45 nm)

Lactam

- 2-Pyrrolidone (5-membered lactam)
- HEP: 1-(2-hydroxyethyl)-2-pyrrolidone (5-membered lactam)
- ε-Caprolactam (CPL) (7-membered lactam)

Betaine

- Trimethylglycine

Organic solvent

- Glycerin
- Triethylene glycol
- 1,2-Hexanediol

Acetylene Glycol-Based Surfactant

- "OLFINE E1010": manufactured by Nissin Chemical Industry Co., Ltd., acetylene glycol-based surfactant, a compound in which —$OR^3$ and —$OR^{3'}$ are alkylene oxide groups in formula (1) above, HLB value: 11.
- "SURFYNOL 104PG50": manufactured by Air Products Japan, Inc., acetylene glycol-based surfactant, a compound in which —$OR^3$ and —$OR^{3'}$ are —OH in formula (1) above, HLB value: 4.
- "SURFYNOL 420": manufactured by Air Products Japan, Inc., acetylene glycol-based surfactant, HLB value: 4.

Another Surfactant

- "BYK348": manufactured by BYK Japan KK, silicone-based surfactant

Alkali

- Triethanolamine

Water

- Ion-exchanged water

2. Evaluation 2.1. Discharge Reliability (Intermittency)

A modified machine of an ink jet recording device LX-10050MF (manufactured by Seiko Epson Corporation) was prepared. The recording device employed the line recording method as shown in FIG. 1. Recording was performed on a recording medium (A4-size Xerox P paper, copy paper manufactured by Fuji Xerox Co., Ltd., basis weight: 64 g/$m^2$, paper thickness: 88 μm) under an environment of a temperature of 25° C. and a humidity of RH 50% in a state in which each of the ink compositions of the examples and the comparative examples filled the recording device. A test pattern was recorded at duty of 100%. Recording was continuously performed on 30 sheets, and a free running time of one minute during which ink was not discharged from the ink jet head was provided after each time of recording of one sheet during recording. After the recording was completed, nozzle checking was performed. The evaluation results are shown in the tables.

Evaluation Criteria

- A: No nozzle with discharge failure
- B: The number of nozzles with discharge failure is within 1%
- C: The number of nozzles with discharge failure exceeds 1%

2.2. Ink Transfer Properties

A solid pattern of 20 mm×20 mm was recorded on a recording medium with the same device, recording medium, and recording environment as described above. The recording was carried out in an environment of a temperature of 25° C. and a humidity RH of 50%. The recording was continuously performed until the thickness of the recorded recording paper stacked on the paper output tray reached 1 cm. The state of ink transfer of ink from the feeding roller to the rear end surfaces of stacked sheets of the recording paper was visually observed. The evaluation results are shown in the tables.

Evaluation Criteria

- A: Ink transfer is not observed when observed from location 30 cm away
- B: Ink transfer is observed when observed from location 30 cm away, but ink transfer is not observed when observed from location 80 cm away
- C: Ink transfer is observed when observed from location 80 cm away 2.3 Curling Resistance A solid pattern was recorded with the same device, recording medium, and recording environment as described above at printing duty of 100%. The test pattern was the same as that for evaluation of ink transfer properties. The recording medium after recording was left face-up (recording surface up) for one week. The rising of the paper edge from the floor surface was measured. The evaluation results are shown in the tables.

Evaluation Criteria

- A: Amount of rising is less than 10 mm.
- B: Amount of rising is 10 mm or more and less than 20 mm.
- C: Amount of rising is 20 mm or more.

2.4. Solubility

Each ink composition was put into a 100 ml bottle, and the bottle was sealed and left to stand in a thermostatic chamber at 60° C. for 24 hours. Thereafter, the appearance was visually observed to evaluate water solubility of the acetylene glycol surfactants. The evaluation results are shown in the tables.

Evaluation Criteria

- A: Separation into oily phase is not observed
- B: White turbidity is slightly observed
- C: Separation into oily phase is observed 3. Evaluation Results From the evaluation results in the tables, in each of the examples, a color material, an acetylene glycol-based surfactant, glycerin, and a 6-, 7-, or 8-membered lactam were contained, the content of glycerin was 9% by mass or less with respect to the total mass of the ink composition, and the mass ratio of the content of the 6-, 7-, or 8-membered lactam to the content of the acetylene glycol-based surfactant was 0.5 or more and less than 5; meanwhile all of curling resistance, solubility, ink transfer suppression, and discharge stability were excellent.

On the other hand, the mass ratio of the content of the 6-, 7-, or 8-membered lactam to the content of the acetylene glycol-based surfactant was less than 0.5 in Comparative Example 1, and solubility thereof was poor. The mass ratio of the content of the 6-, 7-, or 8-membered lactam to the content of the acetylene glycol-based surfactant was 5 or more in Comparative Example 2, and discharge stability thereof was poor. Comparative Example 9 did not contain glycerin, and ink transfer suppression and discharge stability thereof were poor.

What is claimed is:

1. An aqueous ink jet ink composition, comprising:

a color material;

an acetylene glycol-based surfactant;

glycerin; and a 6-, 7-, or 8-membered lactam, wherein a content of the glycerin is 9% by mass or less based on a total mass of the ink jet ink composition, and a mass ratio of a content of the 6-, 7-, or 8-membered lactam to a content of the acetylene glycol-based surfactant is 0.5 or more and less than 5.

2. The ink jet ink composition according to claim 1, comprising a resin.

3. The ink jet ink composition according to claim 1, comprising a betaine.

4. The ink jet ink composition according to claim 2, wherein the resin is a water-soluble resin.

5. The ink jet ink composition according to claim 1, wherein the mass ratio of the content of the 6-, 7-, or 8-membered lactam to the content of the acetylene glycol-based surfactant is 2 to 4.

6. The ink jet ink composition according to claim 2, wherein the resin is a water-soluble urethane resin.

7. The ink jet ink composition according to claim 1, wherein the color material includes any one or more of a self-dispersed pigment and a pigment dispersed by a dispersant resin.

8. The ink jet ink composition according to claim 1, wherein a content of inorganic fine particles does not exceed 0.05% by mass based on the total mass of the ink jet ink composition.

9. The ink jet ink composition according to claim 1, wherein the content of the glycerin is 0.5% to 9% by mass based on the total mass of the ink jet ink composition.

10. The ink jet ink composition according to claim 1, wherein the 6-, 7-, or 8-membered lactam includes ε-caprolactam.

11. The ink jet ink composition according to claim 1, which is used for recording onto an absorptive recording medium.

12. The ink jet ink composition according to claim 1, wherein the acetylene glycol-based surfactant includes an acetylene glycol-based surfactant having an HLB value of 5 or less.

13. A recording method, comprising:

an ink adhering step of discharging the ink jet ink composition according to claim 1 from an ink jet head to make the jet ink composition adhere to a recording medium.

14. The recording method according to claim 13, performing recording in a line recording method.

* * * * *